United States Patent [19]

Falkner et al.

[11] 3,979,808

[45] Sept. 14, 1976

[54] METHOD OF CONTINUOUSLY PROCESSING METAL BANDS INTO HOLLOW RAILS

[75] Inventors: Raimund Falkner, Roppen, Austria; Heinz Grune, Solingen, Germany

[73] Assignee: Rapena Patent- und Verwaltungs AG, Liechtenstein, Liechtenstein

[22] Filed: Oct. 10, 1975

[21] Appl. No.: 621,560

Related U.S. Application Data

[63] Continuation of Ser. No. 485,278, July 2, 1974, abandoned, which is a continuation of Ser. No. 324,214, Jan. 16, 1973, abandoned.

[30] Foreign Application Priority Data

| | | |
|---|---|---|
| Jan. 19, 1972 | Switzerland | 759/72 |
| Oct. 6, 1972 | Switzerland | 14674/72 |
| Oct. 31, 1972 | Switzerland | 15842/72 |

[52] U.S. Cl. .................... 29/155 R; 29/432; 29/463; 29/514; 72/164; 138/164; 138/166

[51] Int. Cl.$^2$ .................... B23P 17/00

[58] Field of Search .................... 29/155 R, 432, 463, 29/514; 72/164, 181; 138/164, 166

[56] References Cited

UNITED STATES PATENTS

| | | | |
|---|---|---|---|
| 999,267 | 8/1911 | Slick | 29/463 |
| 2,251,967 | 8/1941 | Yoder | 72/181 X |
| 2,288,119 | 6/1942 | Weightman | 72/164 |
| 2,741,831 | 4/1956 | Johnson | 29/155 R X |
| 2,753,962 | 7/1956 | McBerty | 29/463 UX |
| 2,856,680 | 10/1958 | Johnson et al. | 29/432 |
| 3,601,940 | 8/1971 | Simon | 29/155 R X |
| 3,638,465 | 2/1972 | Lickliter | 72/181 |
| 3,689,970 | 9/1972 | Falkner | 29/155 R |

*Primary Examiner*—Charlie T. Moon
*Attorney, Agent, or Firm*—Cushman, Darby & Cushman

[57] ABSTRACT

A method of continuously processing two bands of material into profiled rails, inserting insulating material adjacent their lateral longitudinal borders, and then connecting their lateral longitudinal borders through the insulating material. Initial corrugations are formed in each of the bands, and the bands are simultaneously passed between rotating pairs of forming rolls. The initial corrugations formed in the bands are increased so that the length of each enveloping line of each part of each band is longer than the enveloping line contemplated for the corresponding part. The longitudinal border of one of the rails is provided with projections, and the border of the other rail is provided with openings. Finally, the longitudinal border provided with projections is bent around the other longitudinal border, and its projections are forced through the strip of insulating material into the openings of the other longitudinal border. A tenoned folder connection of the longitudinal borders which is free from metallic contact between the rails is thus created.

13 Claims, 21 Drawing Figures

METHOD OF CONTINUOUSLY PROCESSING METAL BANDS INTO HOLLOW RAILS

This application is a continuation of application Ser. No. 485,278, filed July 2, 1974, now abandoned, which was a continuation of application Ser. No. 324,214, filed Jan. 16, 1973, now abandoned.

The present invention relates to a method of continuously processsing two metal bands into two profiled rails by pairs of forming rolls and connecting their lateral longitudinal borders by folded welts to form a hollow rail after inserting strips of insulating material.

The metal bands are simultaneously passed between rotating pairs of forming rolls and first corrugated in certain areas to facilitate subsequent profiling. In addition, this invention relates to hollow rails made according to the method of this invention, by way of example for use as door and window frames.

Profiled rails of a variety of shapes have long since been known for doors and windows besides hollow profile rails. There exist several known methods of continuously making such profiles, by way of example extruding over a profiled core. This known method, however, is complicated, the profiles made are comparatively costly and since incorporation of insulations is hardly possible they provide inadequate heat insulation, which causes the formation of condensation water particularly in the case of window frames.

Applicant has previously proposed a method U.S. Pat. No. 3,689,970 which enables hollow profiled rails with improved properties to be economically made by continuously processing two metal bands with forming tools and connecting the lateral longitudinal borders by means of folded welts, the metal bands being at the same time pulled through the rotating pairs of forming rolls by a tractive force operating from the formed end. In this process the longitudinal borders of at least one profile are provided with an elastic nonmetallic layer insert and the profiles forced together, beaded over along at least one of the longitudinal borders and interconnected while avoiding metallic contact between the engaging longitudinal borders by means of a folded welt connection which fully encloses the intermediate insert. This heat-insulated hollow profiled rail is made in a single process by this method. This method has proved to be of advantage for making hollow profiled rails with comparatively simple cross-sectional shapes.

One of the problems arising in the step-by-step forming of such longitudinally moving webs or bands resides in the necessary large number of consecutive stations along the working train since each pair of profiled rolls must perform only comparatively limited forming work so that the formed material is not subject to excessively heavy stress. By way of example, in order to transform a narrow metal band into a U-type rails, quite a number of consecutive forming steps are required (U.S. Pat. No. 2,288,119) and their number increases in the case of more complex shapes, by way of example of a fully enclosed hollow rail (U.S. Pat. No. 2,741,831). The difficulty of the continuous forming of webs or bands increases where wider webs or webs are involved where more than one profiling operation is required adjacent to one another.

While metal rails may in this manner be made with several complex profiles, the expenditure therefor is considerable and only very careful dimensioning of the individual forming steps can avoid inadmissible transverse stretching and elongation of the material at points where the formed material is subject to great stress, such stretching and elongation being detrimental in various applications.

For making longitudinally profiled rails formed of only one metal band it has also been proposed (DOS No. 2,030,275) to form preliminary corrugations at the points to be profiled in order to make available the material required for the subsequent formation of the profile. While this preliminary corrugation enables several comparatively flat grooves and ribs to be made in a metal band, they do not suffice to make a rib with walls bent through 180° and contacting one another without substantially stretching and thus weakening the material at the bending line along the outside of the rib.

Against this, the method according to this invention relates to the continuous processing of two bands of material by pairs of forming rolls into two profiled rails and connecting their lateral longitudinal borders, inserting strips of insulating material and producing folded welts to make a hollow rail, the said bands of material being simultaneously passed between rotating pairs of forming rolls while first being corrugated in various areas to facilitate the subsequent profiling operations. The method according to this invention is characterized in that the corrugations are increased until their enveloping lines transversely to the band of material are longer than the enveloping line of the longitudinal profile contemplated in the area involved, that of the longitudinal borders of the two profiled rails contemplated for a folded connection each, one is provided with openings and the other with lug-type projections, and that these longitudinal edges are then forced together, the longitudinal border provided with projections being bent around the other longitudinal border and having its projections forced into the openings in the other longitudinal border through the strip of insulating material so as to create a tenoned folded connection of the longitudinal borders which is free from metallic contact between the rails.

The method according to this invention will now be described in greater detail with reference to exemplified embodiments of hollow rails and the drawing in which.

Figure 3:
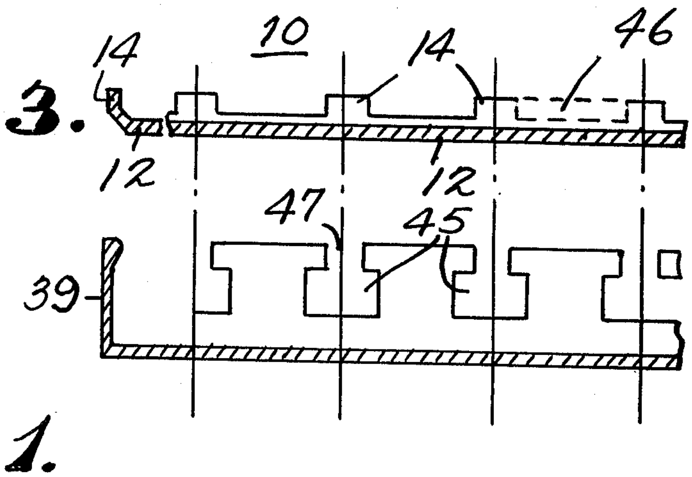
Figure 4:
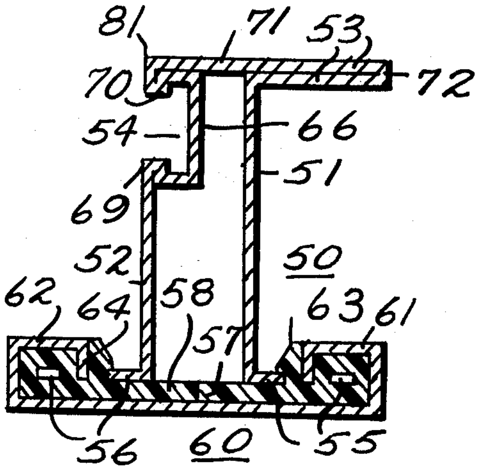
Figure 18:
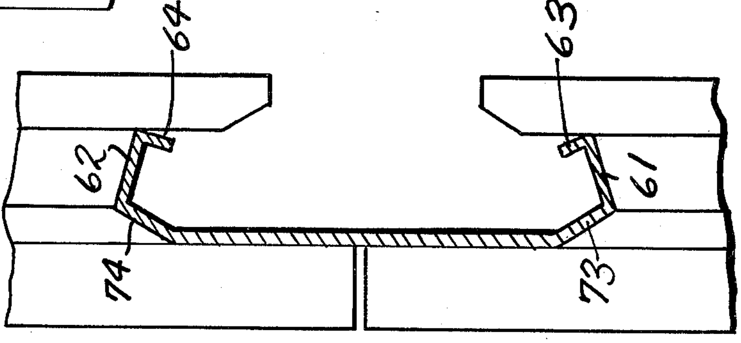
Figure 19:
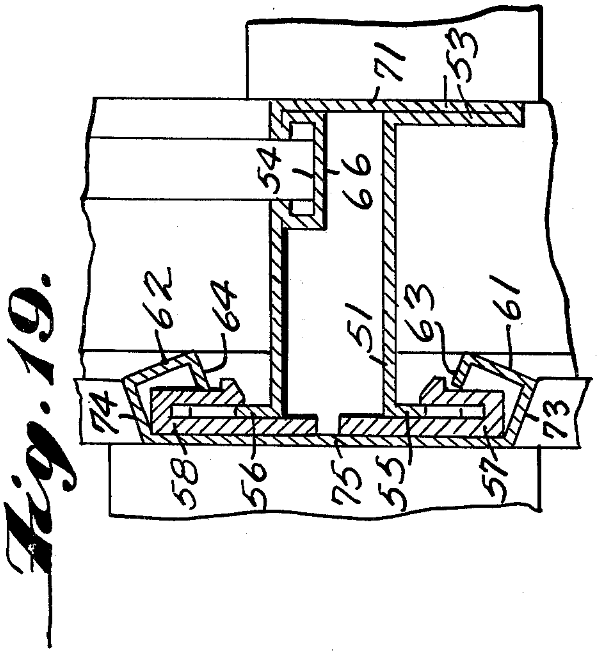
Figure 20:
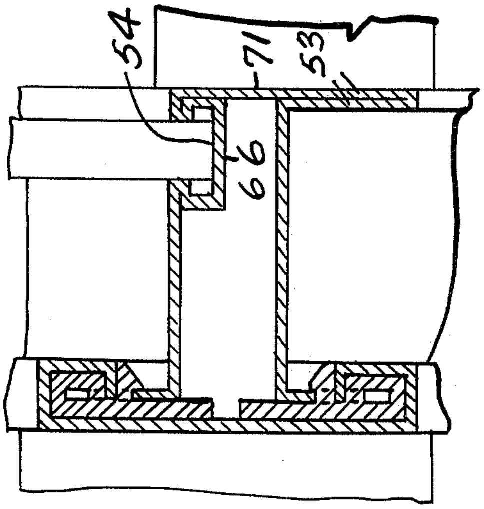
Figure 21:
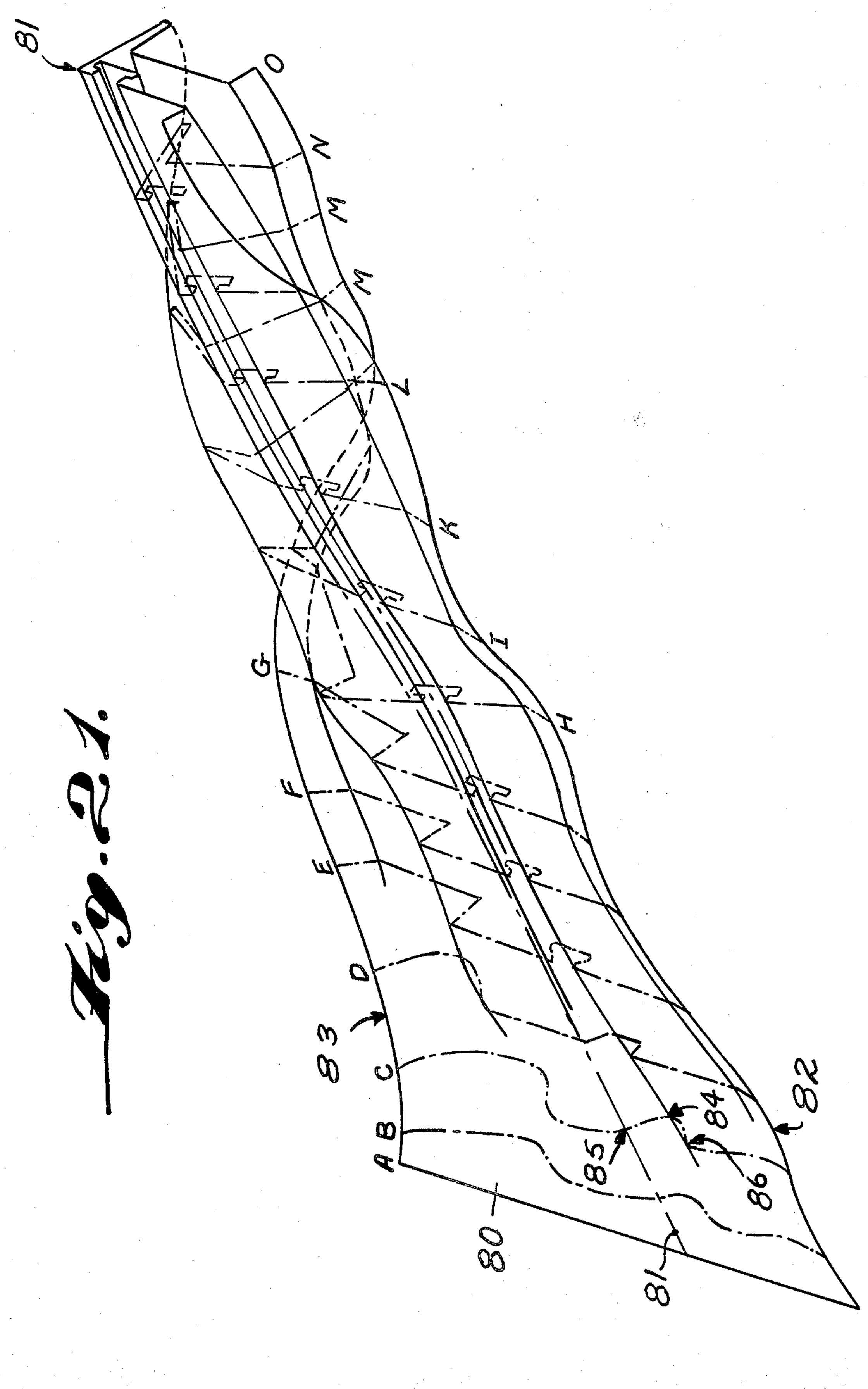

FIG. 3 one of the longitudinal borders of the two rails to be united by a mortised folded connection, shown both in plan view and side view;

FIG. 4 is a cross-section of a further exemplified embodiment of the hollow rail according to the invention;

FIGS. 5 through 17 each show the pairs of rollers for the consecutive forming steps for transforming the metal band into one of the rails of the exemplified embodiment according to FIG. 4;

FIG. 18 shows the pair of rolls for the last forming step for the other rail of the exemplified embodiment according to FIG. 4;

FIGS. 19 and 20 show the pairs of rolls for connecting the two rails to form the hollow rail according to FIG. 4, and FIG. 21 is a diagram of the step-by-step forming of one of the profiled rails of the hollow rail according to FIG. 4.

Figure 1:
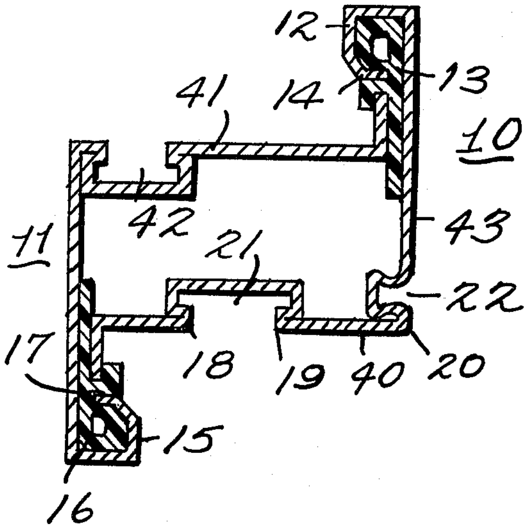
FIG. 1 is a cross-section of an exemplified embodiment of the hollow rail according to the invention.

The present method will first be described with reference to the exemplified embodiment of making a profiled hollow rail according to FIG. 1. This profiled hollow rail, which may e.g. be used for making window frames, consists of a first hollow rail 10 and a profiled rail 11 symmetrical thereto. The upper longitudinal border 12 of the rail 10 is provided with lug-type projections 14 and, together with the elastic heat-insulating intermediate layer 13, is bent around the upper longitudinal border of the rail 11 which is provided with openings so that one of the lugs 14 extends into the opposite opening so that a folded connection is formed between the two rails 10 and 11 which extends along the entire length of the hollow rail without establishing metallic contact between the two rails 10 and 11. In the same manner, the lower longitudinal border 15 of the rail 11 is provided with lugs 17 and, together with the similar intermediate layer 16, bent about the perforated lower longitudinal border of the rail 10 so as to form a second folded connection with extends along to length of the two rails 10 and 11 below without establishing metallic contact.

In order to make a profile according to rail 10 in a working train with a plurality of consecutive forming stations with rotating co-operating pairs of rolls of a flat web of metal, by way of example aluminium or high-grade steel, a large number of such individual forming stations is required since at any one of the stations the webs of metal should be bent by not more than 30 to 60° of angle and since, in bending by 90° in such a forming station, considerable difficulties may arise. But apart from the great expenditure at individual forming stations, making the sharp-edged bend at the points 18, 19 and 20 of the rail involves the well-known difficulty that, owing to the great difference between the inner radius and the outer radius at these points, the web of material undergoes stretching so that the material is thinned thus causing weakening at these points.

Figure 2:
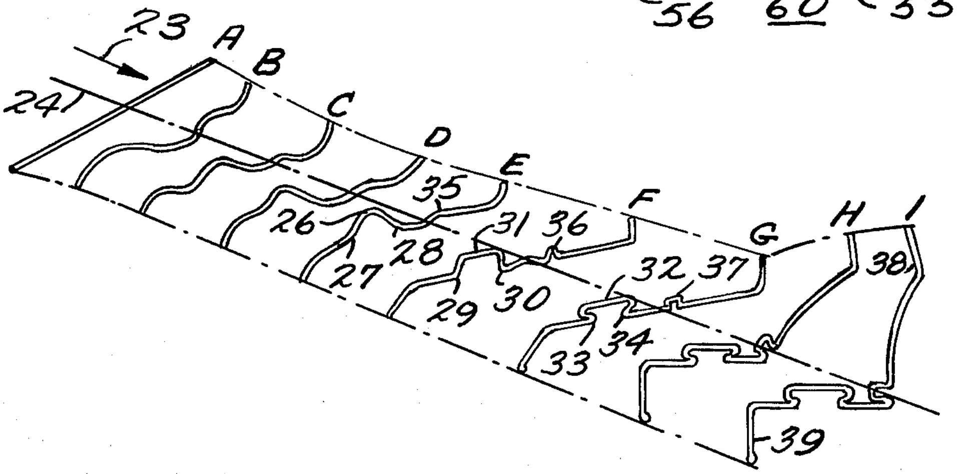
FIG. 2 is a diagram of the step-by-step forming of one of the profiled rails of the hollow rail according to FIG. 1.

Conversely, in the present method the two above-mentioned disadvantages in making the rail 10 are overcome by the fact that forming is effected in the forming steps diagrammatically indicated in FIG. 2. In this FIG. 2, the front end of a web of material moved along the line 24 in the direction of the arrow 23 is shown in perspective, the changing shape of the front end after various forming steps being designated by A through I. While the front end of the flat web of material forms a straight line A at the beginning of the forming process, a certain concave and/or convex curvature is formed in the web as shown at B. Such a curvature is of advantage as a first step in forming because the transverse stiffness of the web of material is thereby reduced and its resistance to subsequent forming in the continuous passage between subsequent pairs of rolls lessened.

The subsequent forming steps to the points C, D and E serve to make the indentations and convexities in the web of material at the points where the two grooves 21 and 22 in FIG. 1 will later be produced. The indentations and convexities are enlarged towards the point E by appropriate forming steps to an extent that the enveloping line is somewhat longer than the enveloping line of the profile there contemplated. At the point E, the enveloping line of the convexity designated by 26, which extends from about the beginning of the convexity at the point 27 to the end of the convexity at the point 28, must therefore be substantially longer than the enveloping line between the points 29 and 30 of the U-type channel 31 of the profile at the point F. The initially U-type channel 31 will then be transformed, by further forming operations, into the groove designated by 21 in FIG. 1. The enveloping lines 27 – 28 and, respectively, 29 – 30 must also be longer than the enveloping line of the groove 21 in FIG. 1, starting from the points 18 – 19. With a groove 21 of the present shape, i.e. with sharp-edged bends 18 and 19, it is of advantage so to strengthen the convexity 26 (point E in FIG. 2) that the enveloping line between the points 27 and 28 is longer than the enveloping line between the points 18 and 19 of the groove 21 (FIG. 1) so that the subsequent upsetting of this U-type channel 31 will cause not a thinning but an increase in the wall thickness at the point 18, 19 (FIG. 1).

This upsetting of the U-type channel 31 between the points F and G into the groove 32, which already substantially has the final configuration of the groove 21 (FIG. 1) is effected by an upsetting process according to this method. For this purpose, appropriately profiled co-operating pairs of rolls are advantageously employed which at the same time reduce the depth of the channel 31 to the predetermined depth of the groove 32 thus causing the folding back at the points 33, 34 and the compression of the same. In this upsetting process the width of the web of material to the left of the line 24 is not reduced in forming between the points E and G.

Also in making the dovetail groove 22 (FIG. 1), a convexity 35 is first formed at the point E (FIG. 2) in a number of forming steps, a U-type groove 36 is then formed to the point E and a dovetail groove 37 to the point F. Here again, it must be ensured that the enveloping line of the convexity 35 is adequately longer than the enveloping line of the completed dovetail groove 37.

In further forming steps according to points H and I, the rail 10 is then completed with the exception of the right-hand longitudinal border designated by 38 at the point I. As indicated above with reference to FIG. 1, this border must then be provided with lugs while the left-hand longitudinal border designated by 39 is given a corresponding number of openings.

As experience has shown, the upsetting operation enables mechanically perfect and stable longitudinal profiles with accurately predetermined dimensions to be made in just a few forming steps, the selection of the length of the indentations and convexities providing the possibility to achieve thickening of the material and condensation of structure at the desired points of the profiles. It is even possible to produce sharp-edged bends of 180° with virtually contacting inner sides of the parallel walls, as indicated in FIG. 1 on either side of the groove 42. Such shapes have so far been impossible to produce according to the generally known art of roll forming metal bands, and the rule has applied that the smallest admissible inner radius of bends must approximately correspond to the thickness of the metal band processed since otherwise material elongation accompanied by material thinning along the outer radius become inadmissibly large. In the present method this limitation is no longer necessary and inner radii of any smallness may be achieved since the upsetting of the metal band causes material to be supplied to the bending point so that no elongation or thinning of the material can occur. Nor need the outer side of the bends be of semicircular configuration as previously; in the upsetting operation it may be formed to exactly rectangular configuration, which lends the roll-formed profiles made according to the present method an appearance very similar to that of extruded profiled bodies but without the length structures on the surface, frequently undesirable, caused by the extrusion core.

In the present method, forming and upsetting of the metal bands is effected, as described above, by the interaction of pairs of rolls arranged on parallel horizontal shafts and rotating during the passage of the metal band involved. For reasons well-known, which are explained, by way of example, in the above-mentioned U.S. Pat. No. 3,689,970 it is of advantage if the metal band is under a mechanical tensile stress in the longitudinal direction as it passes the consecutive pairs of rolls. In the said known process this tensile stress is created in that the metal band is gripped at its formed end and pulled through all consecutive pairs of rolls while all feeding force is avoided. Since an upsetting effect is exercised on the passing metal band besides the normal forming process in many of the consecutively arranged pairs of rolls according to the present method, the necessary tractive forces are too high to be added and provided by a single tractive device located at the formed end since this would entail the hazard that the band breaks. On the other hand it must be avoided that a thrusting force is exercised on the passing metal band as such is normally the case in pairs of rolls which are driven individually or jointly. In the present method the problem was solved by ensuring that the consecutive pairs of rolls, while being driven individually or jointly on the one hand, on the other hand have their effective diameters gradually enlarged by a certain percentage so that the determinative circumferential speed of a following pair of rolls is somewhat higher than that of the preceding pair of rolls. The passing metal band is thus subject to a longitudinal tension which is newly built up in each pair of rolls and prevents the development of a thrusting force acting on the band surface.

Suitable dimensioning of consecutive pairs of rolls with increasing circumferential speed makes it possible to exercise the desirable longitudinal tensile stress on the passing metal band, to avoid the undesirable thrusting forces on the band surface and nonetheless to avoid all detriment to the band surface by the tractive forces of the roll surfaces which pull it. By way of example, it was found that with pairs of rolls with a diameter of about 220 mm on an average of the effective roll surfaces, an increase of this diameter by increments of 0.4 percent in consecutive pairs of rolls produces an increase in the circumferential speed which supplies an adequate tractive force for pulling the metal bands through the pairs of rolls, which are additionally driven, even if an upsetting process occurs in forming the metal band in such a pair of rolls. No adverse effects on the surface of the metal band can be discovered and chatter marks or other marks do not appear. On the other hand it was found that an increase in the diameter of the effective roll surfaces by only 0.05 percent is not adequate to obtain a sufficient tractive force.

As stated above, it is an essential characteristic of the present method that the longitudinal borders of the two metal bands destined for the hollow profile in question are on the one hand provided with openings and, on the other, with lug-type projections at a suitable period during the production process of the part profiles. In the exemplified embodiment of the thermally insulated hollow rail according to FIG. 1, the longitudinal border 12 of the rail 10 is provided with lugs which are indicated above in FIG. 3, while the associated longitudinal border of the rail 11 is shown provided with the openings 45 below. As the two part profiles 10 and 11 are assembled and the upper folded connection according to FIG. 1 is produced, the upper longitudinal border of the part profile 10 and the upper longitudinal border of the part profile 11 are located in the position indicated in FIG. 3. It should here particularly be noted that, in making the upper folded connection on the hollow rail according to FIG. 1, the longitudinal border 12 is bent around the upper longitudinal border of the rail 11 which is provided with openings 45, that the lugs 14 are forced through the outer layer of the insulating strip 13 and inserted in the openings 45. In this process it may be of advantage to heat the strip-type or profiled insert 13 which may by way of example consist of tough plastic polyvinyl chloride and is continuously placed on the upper longitudinal border of the part profile 11 shortly before assembling, to a temperature of approx. 50° to 100°C so as to make it more ductile. This will ensure that, after the lugs 14 have been forced into the openings 45, the material of the insert 13 under heavy pressure will fill all remaining interstices around the lugs 14. A corresponding process takes place in assembling the lower longitudinal border 15 of the part profile 11 with the lower longitudinal border 15 of the part profile 10 into a tenoned folded connection.

A hollow profile rail formed of two part profiles 10 and 11 by means of tenoned folded connections is at least equal or superior with respect to torsional strength to all hollow rails e.g. rails welded together of part profiles. Nonetheless all metallic contact between the two part profiles is prevented so that excellent thermal insulation between the part profiles is ensured. The tenoned folded connections made around the inserts 13 and 16 respectively under great pressure in addition possess a mutual mechanical prestress in the embracing longitudinal borders so that they are positively connected and also stable against transverse forces.

In the exemplified embodiment of the lugs 14 shown in FIG. 3, the said lugs are made by punching out of the bent-up outer edge of the longitudinal border 12 a section designated by 46 so that the tongue-type lugs 14 remain. A width of the remaining lugs of approx. 4 mm has proved to be advantageous, while the distance of the lugs from centre line to centre line is approx. 200 mm. The width of the openings 45 must naturally be adjusted to the width of the lugs 14 and in the present example it advantageously amounts to approx. 10 mm with a height of approx. 8 mm. A lug 14 inserted in the opening 45 with a sheet thickness of e.g. 2 mm then has a distance on all sides of approx. 3 mm from the edges of the opening 45. The configuration of the openings shown in FIG. 3 with the slot 47 is recommended where the openings are made by providing the one longitudinal border 39 of the rail 11 with the openings 45 by means of a rotating fly cutter. Such rotating fly cutters are generally known and consist of a flat disc located normally to the edge 39, an appropriately shaped fly cutter projecting from the circumference of the said disc, the cutter having a neck to form the slot 47 and a wider head to produce the rectangular opening 45. The speed of the rotating disc is adjusted to the continuous longitudinal travel of the rail 11 in such a manner that the fly cutter produces consecutive openings 45, 47 at the predetermined interval of e.g. 200 mm. Such rotating fly cutters are known in this technical field and require no more detailed description. If desired, openings 45 without the slot 47 may naturally be provided, this requiring so-called multiple punching tools which simultaneously punch a plurality of openings 45, the multiple punching tool travelling a short length of way with the moving rail 11 in operation and subsequently returning to its idle position. Such moving multiple punching tools are generally known and require no further description.

In the exemplified embodiment described with reference to FIG. 3 the individual lugs 14 constitute tongue-type bent-up portions of the outer edge of the longitudinal border. Naturally lugs of some other configuration may be provided in the longitudinal border, such as appropriate proud stampings from the longitudinal border 12 or pins of any configuration pressed into this longitudinal border 12, the configuration of the associated openings the longitudinal border 38 of the rail 11 being adjusted to the same.

An unsymmetrical hollow rail as may be made by the present method is shown in cross-section in FIG. 4. With the previously usual methods of roll forming such hollow rails could not be produced in continuous operation. The hollow rail according to FIG. 4 consists of an upper profiled rail 50 with the two side walls 51 and 52, the horizontally arranged double-walled web 53, the longitudinal groove 54 in the side wall 52 and the two longitudinal borders 55 and 56 respectively on the side walls 51 and 52 respectively. This upper profiled rail 50 is assembled with the two thermally insulating intermediate layers 57 and 58 respectively and the lower profiled rail 60 to form a hollow profile which is on both sides provided with a folded connection in which the two longitudinal borders 61 and 62 of the rail 60 are bent around the longitudinal borders 55 and 56 respectively of the rail 50 and engage appropriate holes in the longitudinal borders 55 and 56 with lug-type projections 63 and 64 respectively. However, the insulating intermediate layers 57 and 58 thermally separate the two profiled rails 50 and 60 so that there is no metallic contact between them since these intermediate layers 57, 58 also fill all interstices between the lugs 63, 64 and the longitudinal borders 55, 56. With reference to FIGS. 5 through 17, the production of the upper rail 50 will now be described in greater detail; with reference to FIG. 18, that of the lower rail 60; with reference to FIGS. 19 and 20, the assembling of the two profiled rails 50, 60 to form the hollow rail according to FIG. 4. The production process of this profiled rail 50 according to the present method is shown diagrammatically in FIG. 21, the metal band 80 having the dot-dashed cross-sectional configuration shown at the points A, B, C .... M, N, O.

To begin with, a directrix 81 is determined in the horizontal initial position A of the metal band 80, the said directrix corresponding to a particularly marked longitudinal edge of the finished profiled hollow rail, in the present case the exterior edge 81 in FIG. 4. The horizontal area 81–82 of the metal band 80 extending between the exterior edge 82 of the band 80 and the directrix 81 is to remain largely in the horizontal initial position in the present example, with the exception of the longitudinal border 56 which is bent upwards in the course of the forming operation (cf. point O). This first area 81–82 comprises the longitudinal border 56, the side wall 52 and the boundary 66 of the longitudinal groove 54 including its sharp-edged flanges. As indicated in FIG. 21 at the point O, the directrix 81 will finally form one of the longitudinal edges of the completed profiled rail. In the initial position A, the first area 81–82 of the metal band 80 is substantially less wide than the area 81–82 extending from the directrix 81 to the exterior edge 82. In the course of forming, this entire second area 81–83 of the metal band 80 is turned in the clockwise direction about the directrix 81 and forms, with 90° of angle against the initial position, the upper side 71 and the double-walled web 53 and, with 180° of angle against the initial position, the side wall 51 and the longitudinal border 55 of the completed profiled rail.

In making the sharp-edged bends as at the groove 54 of the rail, the well-known difficulty arises that, owing to the great difference between the inner and the outer radii, the web of material undergoes stretching at these points so that the material is thinned, which results in weakening. In the present method these difficulties are overcome by sufficiently strong corrugations. While the front side of the flat web of material 81 still forms a straight line A at the beginning of the forming process, the web is first given a certain concave and/or convex curvature indicated at B. Such a curvature as the first step of formation is advantageous because the transverse stiffness of the web of material is thus reduced and its resistance against the subsequent forming in the continuous passage between corresponding pairs of rolls lowered. The subsequent forming steps to the point C are designed to produce indentations and convexities in the web of material at the points where the groove designated at 54 in FIG. 4 will subsequently be formed. The indentations and convexities and, respectively, corrugations are so increased that their enveloping line is longer than the enveloping line of the profile there contemplated. At point C the convexity there designated at 84, of which the enveloping line which extends from about the beginning of the convexity at point 85 to the end of the convexity at point 86, must be longer than the enveloping line between the points 69 and 70 of the U-type channel 54 of the profile in the rail 50. Further forming will then produce, from this presently round convexity, the groove designated at 54 in FIG. 4. With a groove 54 of the present configuration, i.e. with sharp-edged bends 69 and 70, it is of advantage to enlarge the convexity 84 (point C in FIG. 21) in such a manner that the enveloping line between the points 85 and 86 is longer by 2 to 5 percent than the enveloping line between the points 69 and 70 of the groove 54 (FIG. 4) so that no thinning but a condensation of the wall thickness at the points 69, 70 (FIG. 4) is obtained when the U-type channel 54 (point E through L, FIG. 21) is upset.

This transformation of the U-type channel 84 between the points E and L to form the groove 54 with its largely final shape is effected by an upsetting process according to the present method. Appropriately profiled co-operating pairs of rolls are preferably employed for the purpose, the said rolls at the same time reducing the depth of the channel 84 to the prescribed depth of the groove 54 and thus cause the folding back at the points 69, 70 and the compression of the same. In this upsetting operation no change in the width of the metal band to the left and to the right of the points 85, 86 occurs during forming between the points C and L.

In the forming steps leading to the cross-sections D, E and F of the metal band 80 the subsequent longitudinal groove 54 is on the one hand prepared in the first area

81–82 and, on the other, the folding for the later 180° bend of the double-walled web 53 begun in the second area 81–83. In the forming steps G through L only the final formation of the longitudinal groove 54 is performed in the area 81–82 and then the longitudinal border 56 is bent up vertically relative to the side wall 52 in accordance with the cross-sections M, N and O. On the other hand, the second area 81–83 of the metal band 80 is so formed in the steps G, H, I, K and L that the 180° bending of the double-walled web 53 is completed on the one hand and, in addition, the gradual bending of the upper side 71 about the directrix 81 is effected. At the same time the side wall 51 vertical relative to the web 53 is straightened and the longitudinal border 55 bent downwards relative to the side wall 21 by 90°. The profiled rail finally has the cross-section as per FIG. 4 at the point O. Also for the complex forming steps contemplated in the second area 81–83, sufficiently pronounced corrugation is first produces according to the present method in the forming steps B, C, D so that the enveloping line from the directrix 81 to the exterior edge 83 is longer than the enveloping line from the edge 11 to the exterior edge of the longitudinal border 55 of the completed rail according to FIG. 4.

In making rails with sharp-edged profiles according to the present method it is therefore necessary first to determine the length of the enveloping line on the cross-sectional representation of the desired rail, advantageously the length of the centre line between the outer and the inner wall of the rail. The width of the metal band is then so determined that, with all profile structures and sharp bends, the length of the centre line there is extended by 2 to 5 percent and the lengths of the straight portions of the centre line are added to these values. This ensures that sufficient width of the metal band is available at the points subsequently subject to profiling steps in order to enable the heavy deformations with upsetting and condensation of the band material to be effected.

As experience has shown, the upsetting process described enables mechanically perfect and sharp-edged longitudinal profiles with closely specified dimensions to be produced in only a few forming steps, the selection of the length of the indentations and convexities providing the possibility of obtaining a thickening of the material and a structural condensation at the points desired. The upsetting process is advantageously performed with profiled engaging pairs of rolls. FIGS. 5 through 20 each show an exemplified embodiment of such engaging pairs of rolls for making a sharp-edged profiled rail as per FIG. 4.

Figure 5:
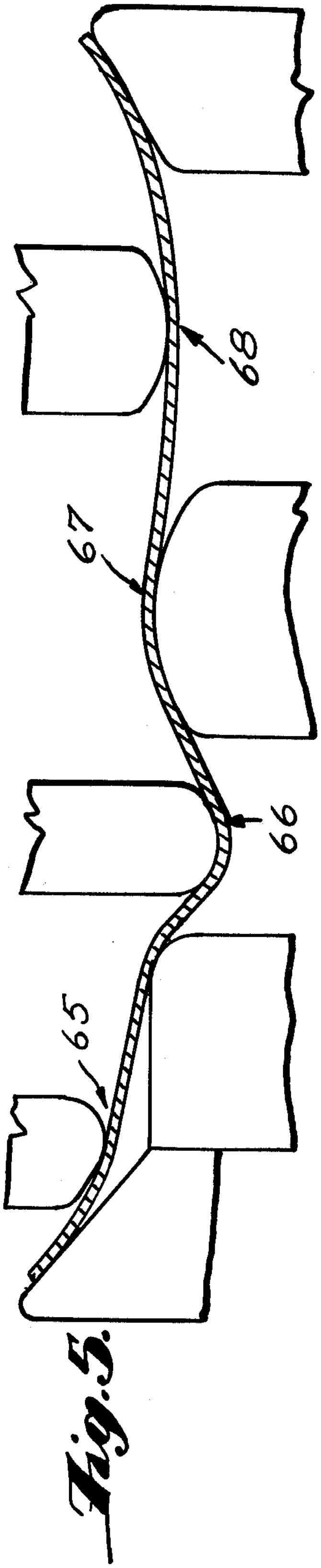
Figure 6:
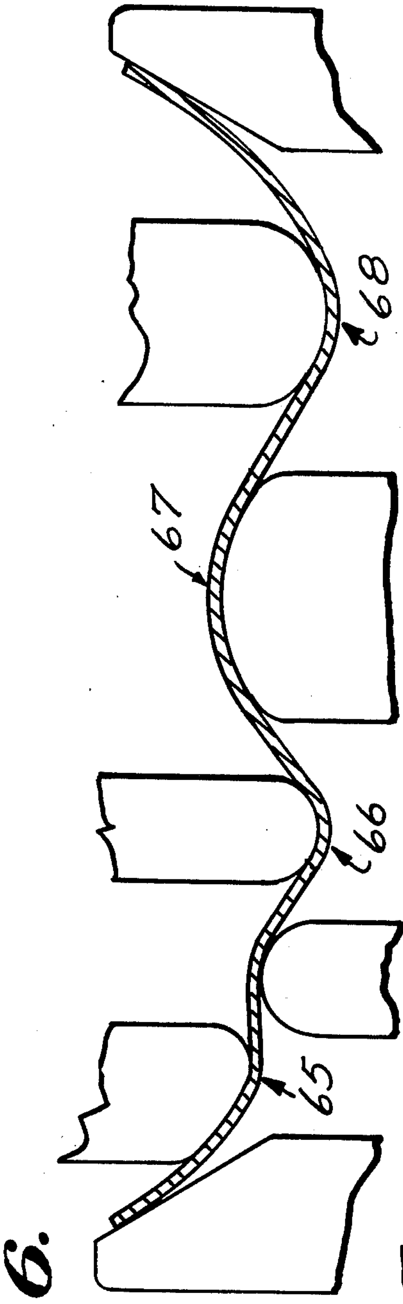
Figure 7:
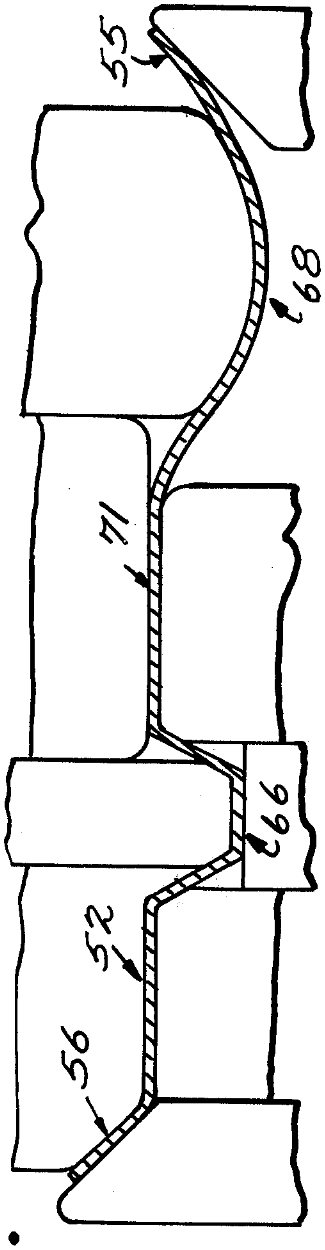

The flat metal band for making the upper rail 50 is first formed, possibly following pretreatment, between rotating pairs of rolls with horizontal axes in the manner shown in FIGS. 5 to 7. The convexity designated at 65 serves for the production of the later longitudinal border 56 of the side wall 52 and the convexity 66 for the preparation of the longitudinal groove 54 in the wall 52. On the other hand, the convexities 67 and 68 serve for the preparation of the web 53 and the later longitudinal border 55 of the side wall 51. As previously mentioned, these convexities are designed to provide sufficiently wide portions of the band for the subsequent heavy deformation with simultaneous upsetting.

Figure 8:
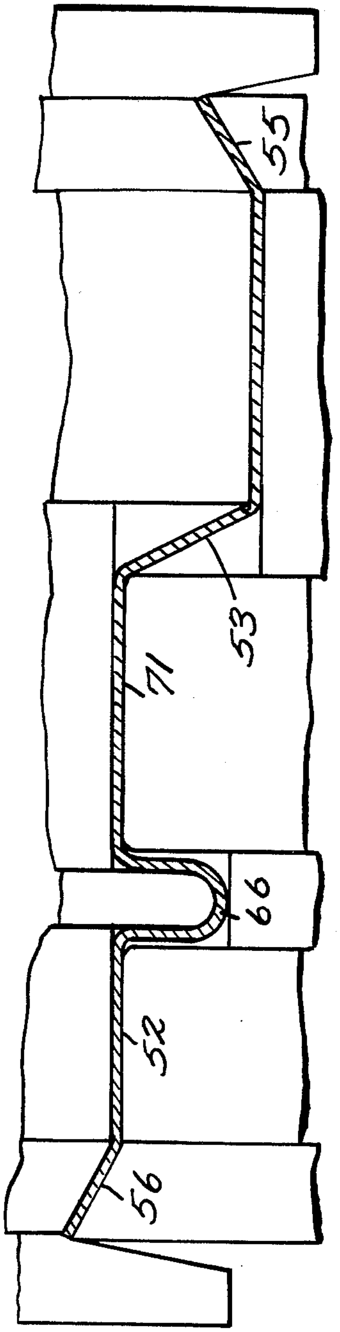
Figure 9:
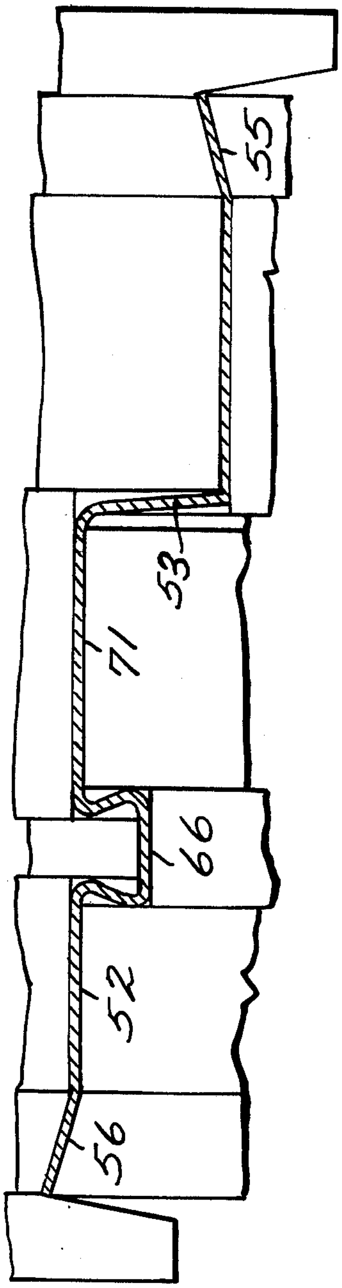
Figure 10:
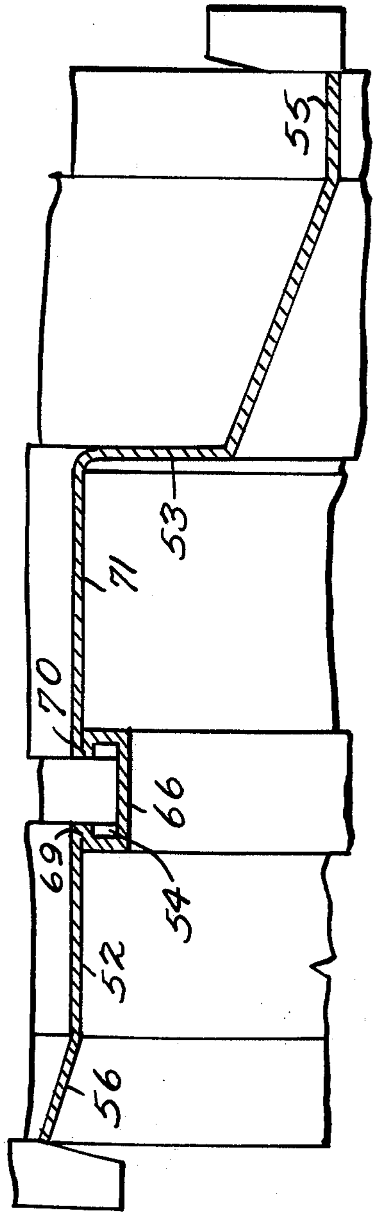
Figure 12:
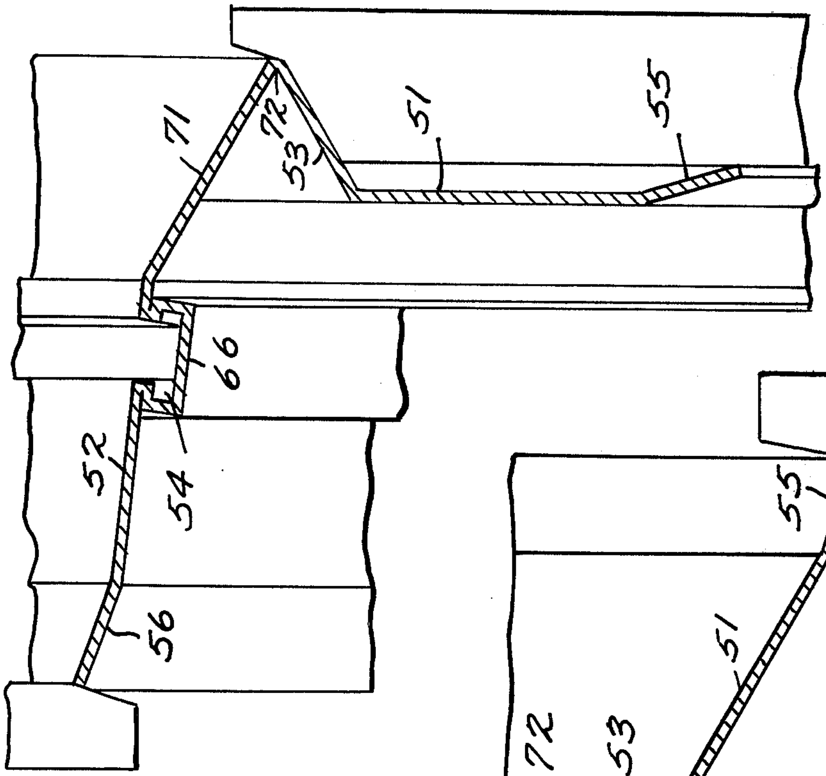
Figure 11:
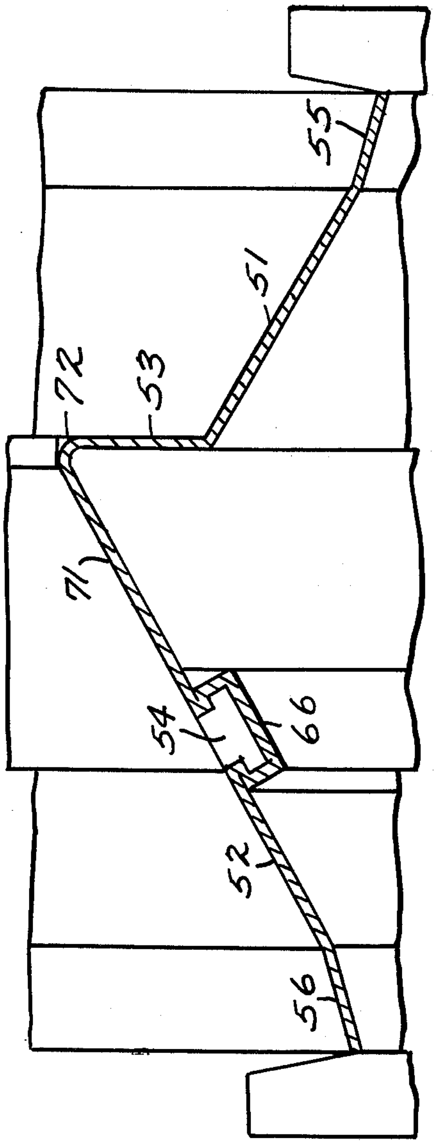
Figure 13:
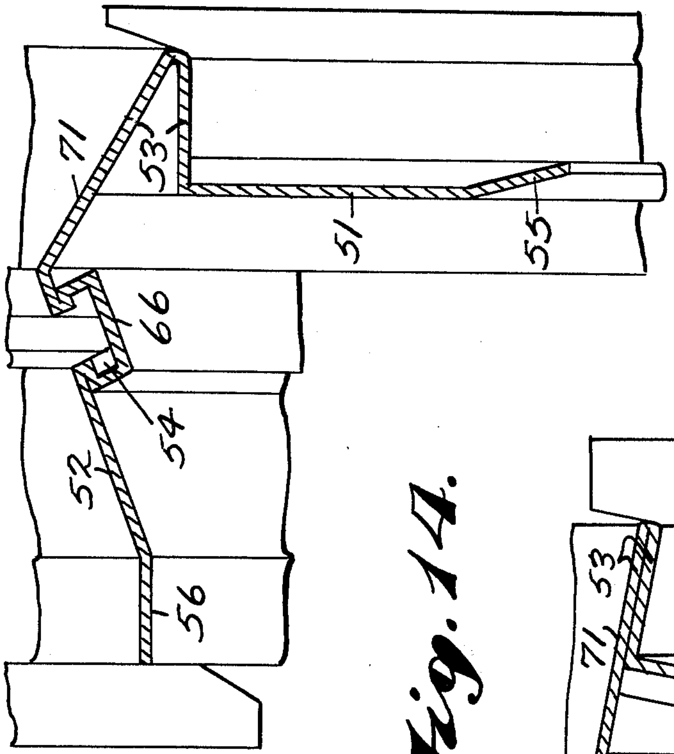
Figure 14:
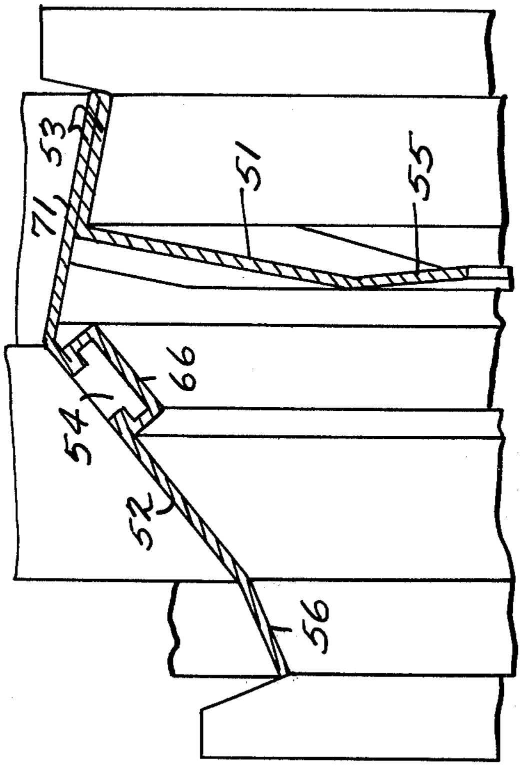

In the pairs of rolls according to FIGS. 8, 9 and 10 the forming of the convexity 66 into the groove 54 is indicated, the upsetting action at the two edges 69 and 70 of this groove 54 being clearly visible in the upsetting operation between the pair of rolls according to FIG. 10. Deflection of the band to the left is prevented particularly by the fact that it is held immovable both at the outer edge of the longitudinal border 56 and in the area of the side wall 52 between appropriate rolls. In addition, the flat upper side 71 of the rail 50 and the upper portion of the horizontal web 53 are prepared as well as the future longitudinal border 55 between the pairs of rolls according to FIGS. 8, 9 and 10.

Figure 15:
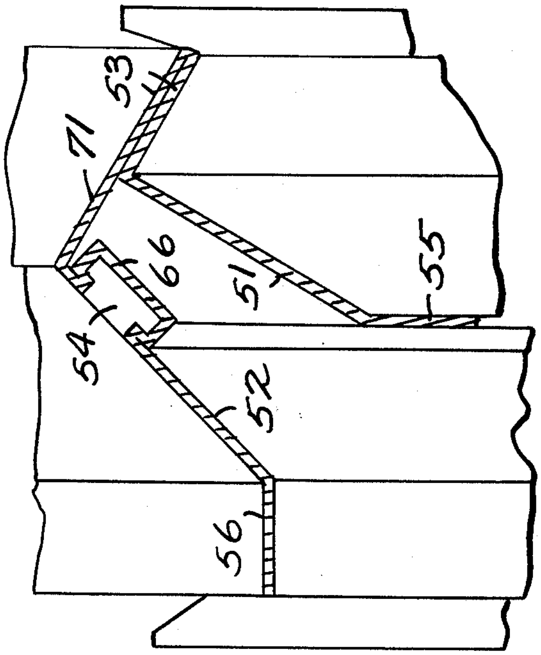
Figure 16:
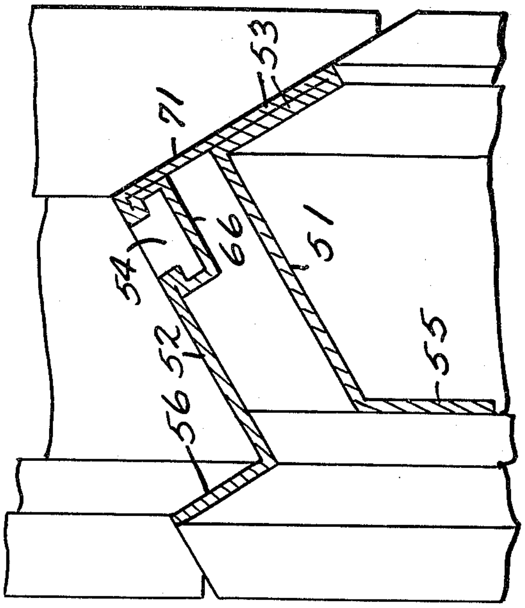

Between further pairs of rolls according to FIGS. 11 through 14 the horizontal double-walled web 53 is first completed and the profiling of the rail 50 subsequently completed between the pairs of rolls according to FIGS. 15 through 17. As can be seen from the said Figures, the plane of the metal band previously arranged virtually in the horizontal is gradually rotated by 90° of angle, which is caused by the fact that, in the present extreme forming processes no faces of individual rolls are desirable which are too strongly inclined relative to the horizontal axes of the co-operating pairs of rolls. The bend 72 of 180° of angle at the outer end of the horizontal web 53 is changed, in the passage between the pairs of rolls according to FIGS. 12, 13, 14, from the rounded shape still shown in FIG. 11 into a more and more rectangular configuration, upsetting and material condensation occurring at the same time without which such a sharp-edged bending operation by 180° of angle would not be possible. In the passage between the pair of rolls according to FIG. 17 the profiled rail obtains its final shape as per FIG. 4.

In the passage between the pairs of rolls according to FIGS. 5 through 17, the necessary openings are punched into the longitudinal borders 55 and 56 at a suitable point. This punching device may be arranged, by way of example, following the pair of rolls according to FIGS. 15 or 16; if desired, however, also at some other suitable point.

Similarly to the flat metal band for the rail 50, an appropriate but less wide metal band is profiled to form the rail 60. Since this rail 60 possesses a substantially simpler configuration than the rail 50, profiling requires fewer successive pairs of rolls than profiling the rail 50. Again, it is advantageous to twist the band, which at first travels at the horizontal, by 90° of angle so that the last forming operation on the rail 60 can be effected in a pair of rolls according to FIG. 18. The flat foot portion 75 has both its sides bent to form the lateral sides 73 and 74 of the folded connection and the longitudinal borders 61 and 62 with the lugs 63 and 64 have been prepared. The lugs are punched into the bent edges of the longitudinal borders 61 and 62 at a suitable station between the individual pairs of rolls.

Figure 17:
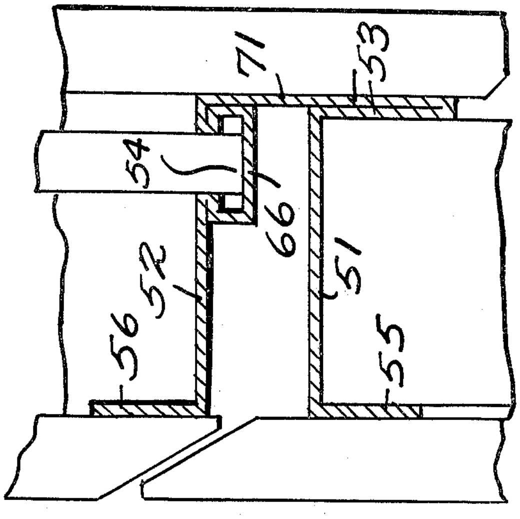

To the longitudinal borders 55 and 56 of the rail 50 emerging from the pair of rolls according to FIG. 17, a profiled thermally insulating intermediate layer 57 and 58 respectively is applied. In a further pair of rolls, the rail 50 so prepared is assembled with the rail 60 emerging from the pair of rolls and supplied to a further pair of rolls according to FIG. 19 in which the outer sides 73 and 74 of the rail 60 are forced further inwards. It is advantageous somewhat to heat the two profiled inserts 57 and 58 prior or following application to the longitudinal edges 55 and 56 of the rail, by way of example to a temperature of 40 to 100°C depending on the material employed.

The rails 50 and 60 emerging from the pair of rolls 19 finally pass into the pair of rolls according to FIG. 20 in which the longitudinal borders 61 and 62 of the rail 60 with the lugs 63 and 64 are forced, through the upper layer of the inserts 55 and 56 respectively, into the openings provided in the longitudinal borders 55 and 56 respectively. Owing to the great pressure the material of the inserts 57, 58 must yield, which is facilitated by previously heating the material. In this manner the interstices between the lugs 63, 64 and the openings in the longitudinal borders 55 and 56 respectively are filled with the plastic employed, which ensures an extremely rigid folded connection between the longitudinal borders 55 and 61 and 56 and 62 respectively. The hollow rail according to FIG. 4 formed of two profiled rails 50, 60 accordingly possesses a mechanical strength, also to torsional and tensile forces, which also meets superior demands. Nonetheless the rail 50 and the rail 60 are thermally insulated relative to one another, which is known to be advantageous in the application of such hollow rails as door or window frames and for other purposes in construction.

The hollow rail emerging from the pair of rolls according to FIG. 20 is passed between additional pairs of rolls in the known manner for the purpose of calibration and, possibly, straightening, and subsequently passes to a continuously operating cutting apparatus which severs the continuously made hollow rail into sections of a predetermined length.

Despite the extreme forming processes and sharp-edged configuration of bends, the surface of the formed metal bands is treated so kindly since a continuous pushing and tractive force is exercised by the individual pairs of rolls that no undesirable longitudinal structures will be visible on the outside of the finished hollow rail according to FIG. 4. It es even possible to perform the present method with metal bands which have one or both sides provided with a coat, by way of example an anodized layer or a thin plastic coat.

In the exemplified embodiment, described with reference to FIG. 21 of the present method of forming a metal band into a rail of complex cross-section, it has been assumed that the twisting of the area 81–83 relative to the directrix is effected in the clockwise direction. If desired, it would naturally be possible to effect twisting about the directrix 81 in the opposite direction so that the underside of the metal band 80 would then become the outside of the completed profile rail according to FIG. 4. At all events, the present method for extreme roll forming is not limited to the exemplified embodiments according to FIGS. 1 through 21.

In applying the present rule to the production of a hollow profile according to FIGS. 2 and 4, which is assembled from two profile rails, appropriate twisting of the other metal band during the consecutive forming steps is necessary if the one rail is made according to the present rule and the finished rail reveals a twist relative to the initial position of the band involved, so that the completely profiled other rail is located, prior to being assembled with the second-named rail, in an appropriate position in respect of its longitudinal borders relative to that of the first rail.

In the performance of the present method of making hollow rails with complex profiles in the first rail, it has been found advantageous of the pairs of rolls serving to produce the more complex rail to be driven jointly while the pairs of rolls used in forming the other metal band into the less profiled rail are provided with separate drives. Naturally such separate drive concerns only such pairs of rolls of the second band which are required for forming it until the two rails are assembled. This separate drive is however so designed that an elastically operating clutch is arranged between the pairs of rolls and the drive so that the rate of travel of the second band and, respectively, of the second rail can automatically adjust itself to the rate of travel of the first rail. This is necessary because, after assembling the two rails, the first rail with its rigid drive must naturally determine the rate of travel while the drive of the second rail must automatically adjust itself to that rate of travel. Suitable elastic clutches, by way of example hydrostatic drives which are suitable for the present purpose, are generally known and require no detailed description.

It should also be noted that the heavy stress exerted on the longitudinal borders by the border tensile stresses occurring during forming, particularly of the rail with complex profile, makes it appear advisable to effect all processing of these longitudinal borders for the subsequent folded connection only after the profiled rail involved has largely been completed. By way of example, if the longitudinal borders are on the one hand provided with openings and, on the other, with lug-type projections as described with reference to FIG. 3, it is of advantage to effect processing of the longitudinal borders only after forming is largely completed.

Example:

For making a sharp-edged profile rail according to FIG. 4 an aluminium metal band of 1.75 mm thickness (tolerance + 0.05 or − 0.1 mm) of the AlMg 2.5 alloy (DIN Standards 1725-1 or 1745-1, 2 or 3 and 1784-1 respectively) was used for the rails 50 and 60 in the soft F 18-22 quality with a mill-finish surface. The metal band for the rail 50 was 232 mm wide; that for the rail 60, 119 mm. At a cross-section of the completed thermally insulated rail made in accordance with the present method, and actual length of the formed rail 50 of 223.5 mm was measured along the centre line between the outer side and the inner side, while the formed rail 60 was 116.0 mm long. Accordingly upsetting and material condensation in forming was caused in the magnitude of 232—223.5 = 8.5 mm in the rail 50 and of 119—116.0 = 3.0 mm in the rail 60. Upsetting thus amounts to approx. 3.5 percent in the rail 50 and approx. 2.5 percent in the rail 60.

It is naturally possible to employ qualities and dimensions of aluminium bands as well as of bands made of metals other than the above-mentioned qualities in forming according to the present method. By way of example, thermally insulated rails have been made of high-grade stool, using a material as per No. 4301 DIN Standards 17006 of the quality 5 Cr Ni 18-9, corrosion and acid-proof, cold-rolled (process III c/d), brushed, with a band thickness of 0.9 to 1.1 mm.

The necessary upsetting of the metal bands in the transverse direction that occurs in the present method, requires their preliminary corrugation as explained with reference to FIGS. 1 and 21. Experience shown that the enveloping line of every convexity must be longer by approx. 2 to 5 percent than the enveloping line, measured along the centre between the inner and the outer sides, of the longitudinal profile to be produced in the area involved.

Owing to the extreme forming forces created at a number of pairs of rolls, the previously mentioned longitudinal traction of the band is of advantage; to this end, the determining roll surfaces of a subsequent pair of rolls are driven at higher circumferential speeds than the corresponding roll surfaces of the previous pair of roll. The difference should amount to at least 0.2 percent, but greatly depends on the complexity of the forming to be obtained in the pair of rolls involved. Naturally this longitudinal traction may be dispensed with if no particularly exacting demands are made of the appearance of the surface, i.e. is possible marks in the surface made by the rolls are accepted.

The present method has above been described for metal bands to which it is preferably applied. However, it is also possible to replace one or both metal bands by plastic bands capable of being formed to make hollow rails consisting of one plastic and one metal rails or of two plastic rails. Such hollow rails which consist of at least one plastic rail are naturally thermally insulating per se so that the thermally insulating inserts referred to in FIGS. 1 and 4 may also be dispensed with unless they are desirable for the obtention of firmly bonded folded connections between the longitudinal borders. In processing plastic bands in pairs of forming rolls, the latter and/or the plastic band involved may also be heated during its travel between successive pairs of rolls in order to ensure accurate and permanent forming. With hollow rails which comprise at least one plastic rail, it may be advantageous to provide the surfaces contacting one another in the folded connections with an adhesive when assembling, which will undetachably bond these surfaces together after setting.

What is claimed is:

1. A method of continuously processing two bands of material by pairs of forming rolls into two profiled rails and connecting their lateral longitudinal borders, inserting strips of insulating material and producing folded welts to make a hollow rail, the said bands of material being simultaneously passed between rotating pairs of forming rolls while first being corrugated in various areas to facilitate the subsequent profiling operations, characterized in that the corrugations are increased until their enveloping lines transversely to the band of material are longer than the enveloping line of the longitudinal profile contemplated in the area involved, that of the longitudinal borders of the two profiled rails contemplated for a folded connection each, one is provided with openings and the other with lug-type projections, and that these longitudinal borders are then forced together, the longitudinal border provided with projections being bent around the other longitudinal border and having its projections forced through the insulating strip of material into the openings of the other longitudinal border so as to create a tenoned folded connection of the longitudinal borders which is free from metallic contact between the rails.

2. A method according to claim 1 characterized in that a directrix (81) is determined on at least one of the bands (80) of material, the said directrix coinciding with a marked longitudinal edge of the completely profiled rail, that the first area (81-82) of the band of material extending from the one outside edge (82) to the directrix (81) is largely held in its initial position during the successive forming steps while the second area (81-83) extending from the outer outside edge (83) to the directrix (81) is twisted about the directrix (81) relative to its initial position during the consecutive forming steps so that the said outside edge (83) performs a swinging motion and that the border tensile stress is reduced.

3. A method according to claim 2 characterized in that the second area (81-83) is twisted in the clockwise direction from its initial horizontal position and partly swung underneath the first area (81-82).

4. A method according to claim 2 characterized in that the second of the bands of material is twisted as a whole from its initial position during the consecutive forming steps, and that the completely profiled second rail has its longitudinal borders placed in a position corresponding to the longitudinal borders of the first rail.

5. A method according to claim 1 characterized in that the pairs of rolls serving to form the first band of material into the first profiled rail are driven jointly, while the pairs of rolls serving to form the other band of material into the second profiled rail up to its being assembled with the first rail, are connected, via an elastically operating clutch, to their own drive and that the rate of travel of the second rail is automatically adjusted to that of the first rail.

6. A method according to claim 1 characterized in that the longitudinal borders contemplated for the folded connection between the two profiled rails are provided with openings or lugs only immediately prior to assembling so that weakening of the longitudinal borders in respect of arising border tensile stresses caused thereby may be avoided.

7. A method according to claim 1 characterized in that, in the passage through at least some of the pairs of rolls, the pair of rolls next following exercises a tractive force on the bands of material, the determining roll surfaces of the subsequent pair of rolls being to this end driven at a higher circumferential speed than the corresponding roll surfaces of the preceding pair of rolls.

8. A method according to claim 7 characterized in that the circumferential speed of the subsequent pair of rolls is at least 0.2 percent higher than that of the preceding pair of rolls.

9. A method according to claim 1 characterized in that the enveloping line of the precorrugations is made longer by approximately 2 to 5 percent than that of the longitudinal profiles involved.

10. A method according to claim 1 characterized in that the lug-type projections in one longitudinal border are formed by punching consecutive part areas of the bent-up edge in the shape of bent-up tongue-type lugs.

11. A method according to claim 1 characterized in that, prior to the forced insertion of the lug-type projections in the openings, the strip of insulating material is heated and made elastic.

12. A method according to claim 1 characterized in that, in inserting the lug-type projections in the openings, the pressure is increased until the ductile strip of insulating material fills the remaining interstices between the projections and the openings.

13. A method of continuously processing two bands of material by pairs of forming rolls into two profiled rails and connecting their lateral longitudinal borders, inserting strips of insulating material between the lateral borders of the rails and producing folded welts to make a hollow rail, the said bands of material being simultaneously passed between rotating pairs of forming rolls while first being corrugated in various areas to facilitate the subsequent profiling operations, characterized in that the corrugations are increased until their enveloping lines transversely to the band of material are longer than the enveloping line of the longitudinal profile contemplated in the area involved, a directrix is determined on at least one of said bands of material, said directrix coinciding with a marked longitudinal edge of the completely profiled rail, the first area of said one band of material extending from one outside edge to said directrix is largely held in its initial position during successive forming steps while the second area extending from the other outside edge ot the said directrix is twisted about said directrix relative to its initial position during said consecutive forming steps so that the said other outside edge performs a swinging motion, and the border tensile stress is reduced.

* * * * *